Nov. 23, 1965  H. W. HUFFMAN  3,219,291
DIFFERENTIAL DRIVEN REWINDER
Filed Oct. 1, 1962  4 Sheets-Sheet 1
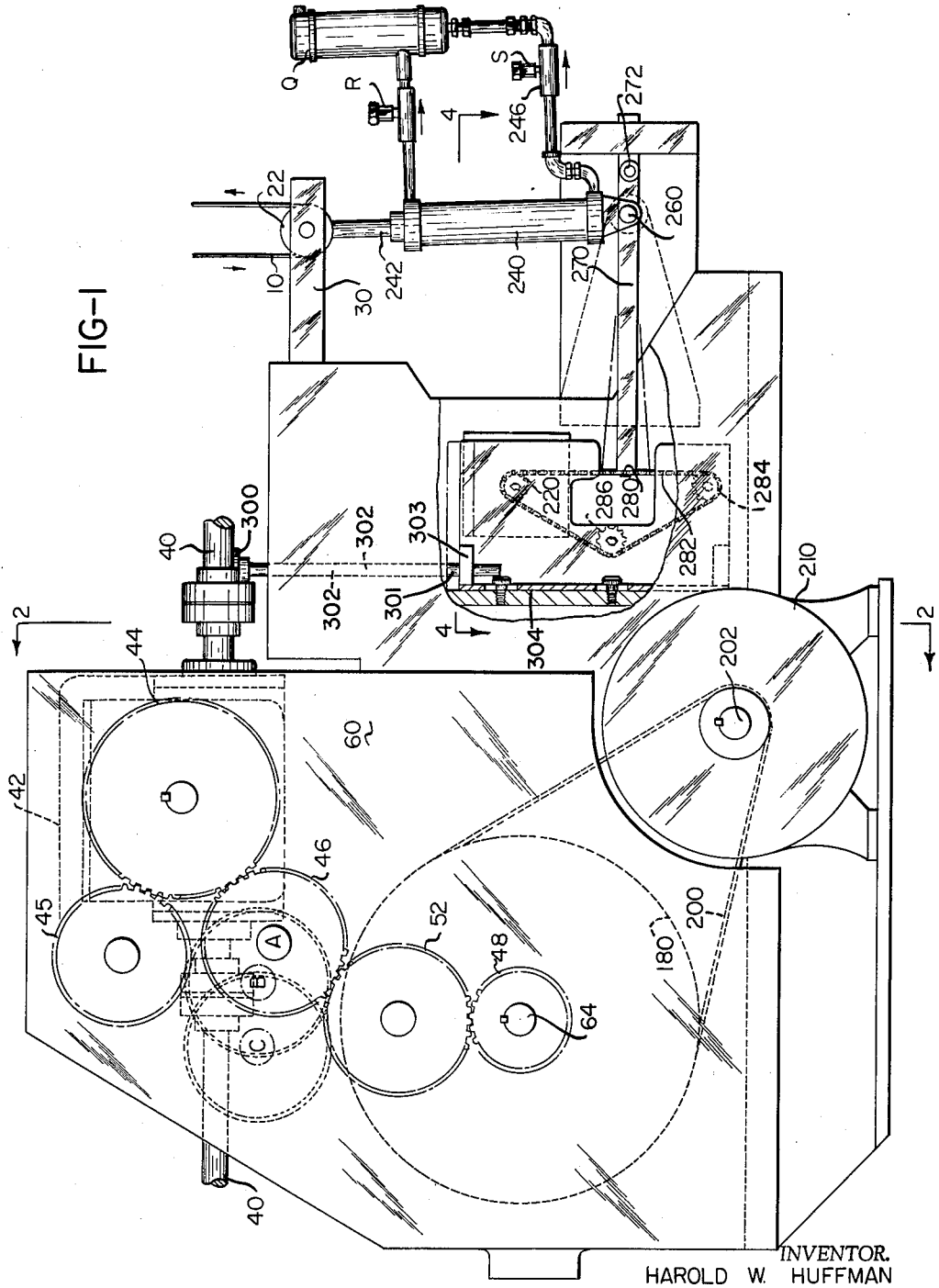
INVENTOR.
HAROLD W. HUFFMAN
BY
*Warren Kinney Jr.*
ATTORNEY Nov. 23, 1965   H. W. HUFFMAN   3,219,291
DIFFERENTIAL DRIVEN REWINDER Filed Oct. 1, 1962   4 Sheets-Sheet 2

INVENTOR.
HAROLD W. HUFFMAN
BY
J. Warren Kinney Jr.
ATTORNEY

Nov. 23, 1965    H. W. HUFFMAN    3,219,291
DIFFERENTIAL DRIVEN REWINDER
Filed Oct. 1, 1962    4 Sheets-Sheet 3
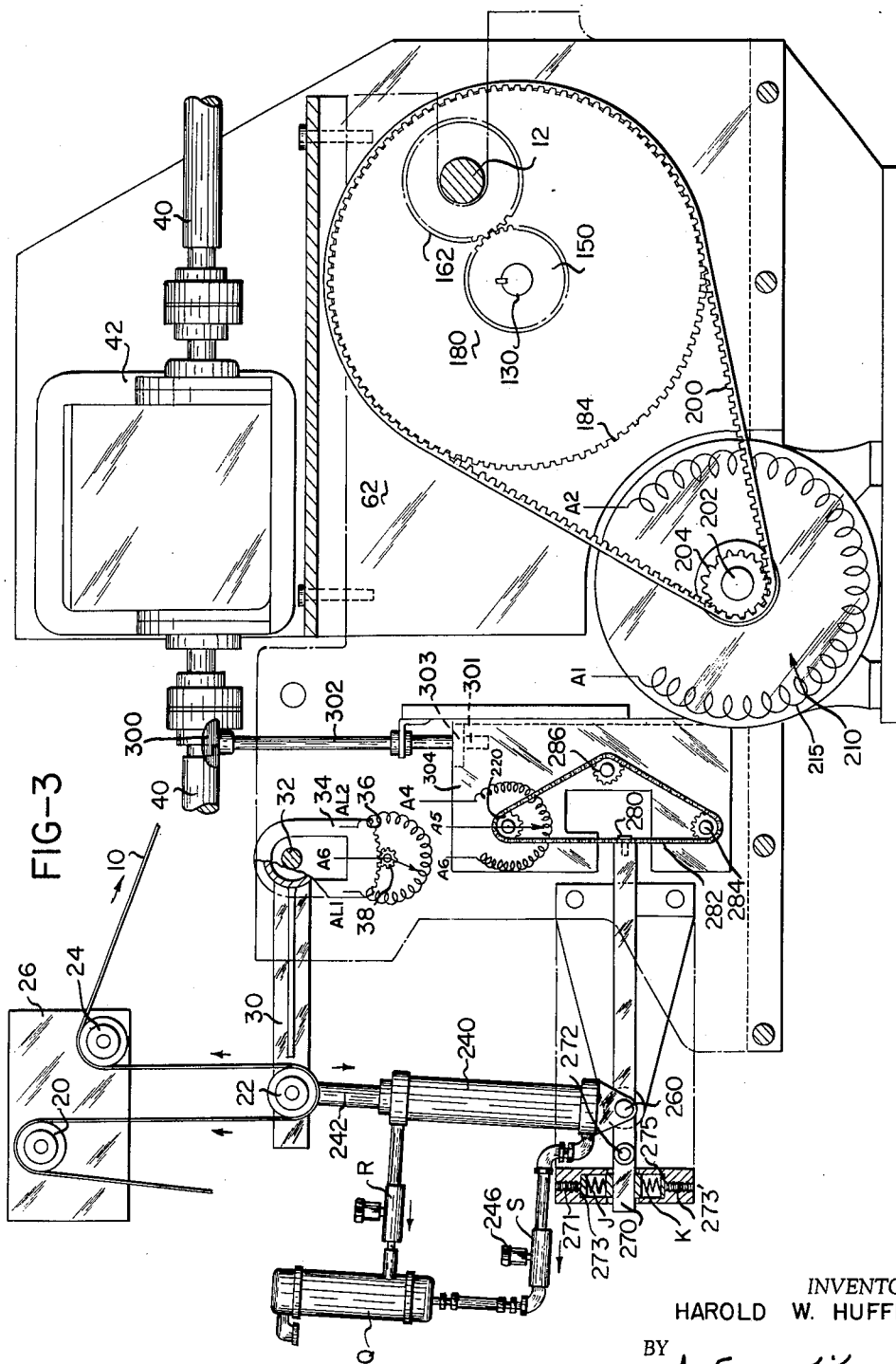
INVENTOR.
HAROLD W. HUFFMAN
BY
*Warren Finney Jr.*
ATTORNEY Nov. 23, 1965  H. W. HUFFMAN  3,219,291
DIFFERENTIAL DRIVEN REWINDER
Filed Oct. 1, 1962  4 Sheets-Sheet 4
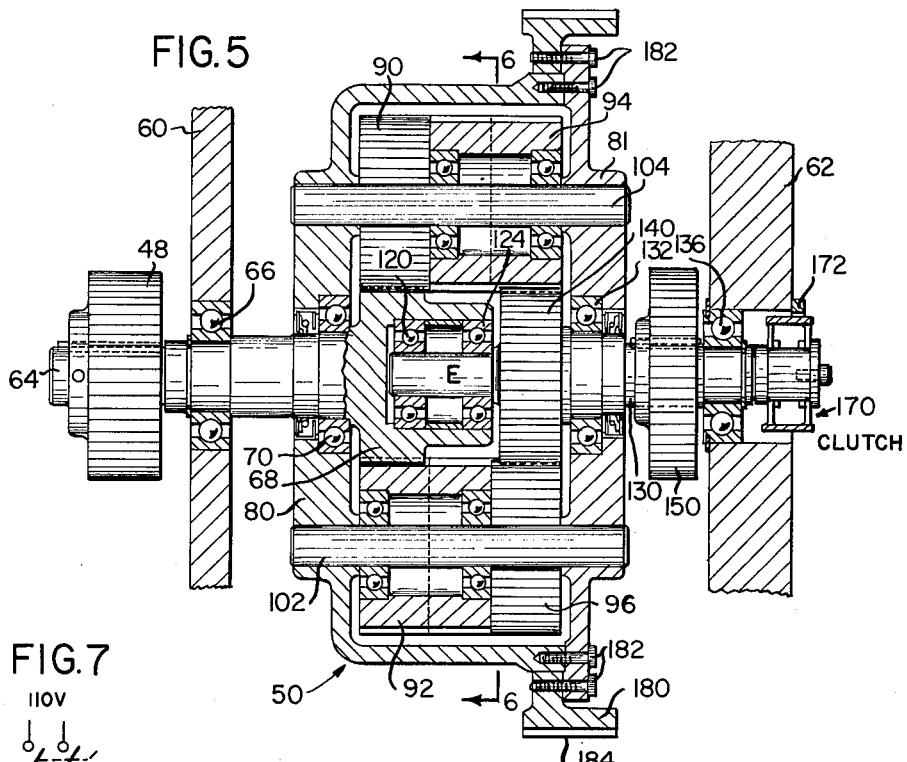
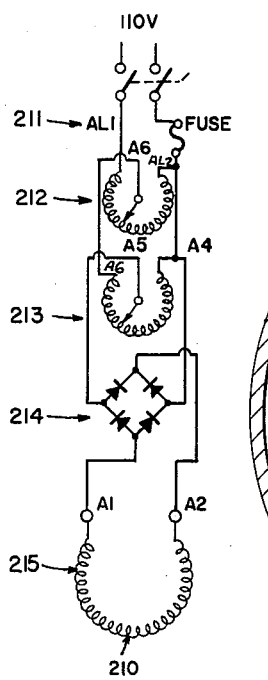
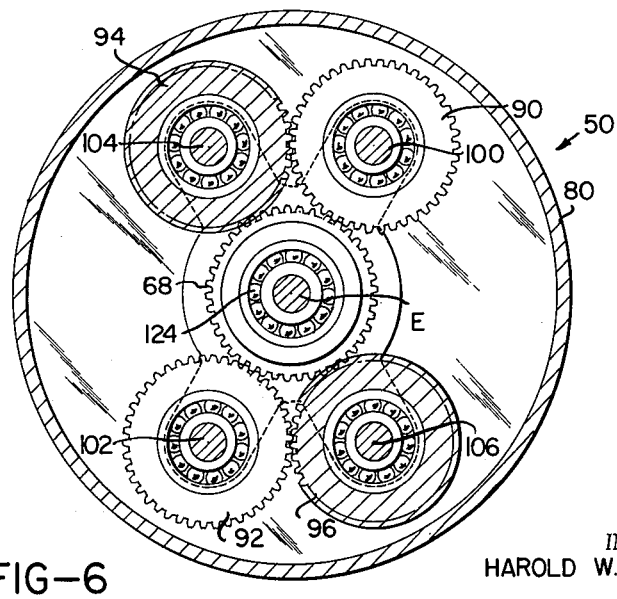
INVENTOR.
HAROLD W. HUFFMAN
BY
*Warren Kenney Jr.*
ATTORNEY United States Patent Office 3,219,291
Patented Nov. 23, 1965

3,219,291
DIFFERENTIAL DRIVEN REWINDER
Harold W. Huffman, Hamilton, Ohio, assignor to The Hamilton Tool Company, Hamilton, Ohio, a corporation of Ohio
Filed Oct. 1, 1962, Ser. No. 227,354
15 Claims. (Cl. 242—75.51)

This invention relates to a differential driven rewinder.

An object of the invention is to provide a rewinder which is driven directly from the main drive shaft of a printing press from which the material to be rewound is being discharged.

Another object of the invention is to provide such a rewinder wherein a differential is interposed between the press drive shaft and the rewind roll whereby to facilitate the accurate tensioning of the web being rewound by means of a dancer roll which actuates a potentiometer which controls the braking characteristics of an eddy current brake.

A further object of the invention is to provide a differential driven rewind which includes a sensitive control system which literally anticipates the amount of correction to be made in the torque characteristics of the rewinder roll incident to operation thereof.

Another object of the invention is to provide a differential driven rewind which is adapted to handle various grades of web stock from the lightest tissue to the heaviest grades, thereby enhancing the overall operating characteristics of the device.

A further object of the invention is to provide control means which effectively control the operating characteristics of the rewind roll in such a manner as to permit a rotary press, with which it is associated, to be quickly stopped and started.

Still a further object of the invention is to provide a dieffrential driven rewind system which utilizes the inherent inertia of the rotatable cage of a differential drive to advantage when initially imparting rotation to the rewind shaft.

A further object of the invention is to provide a rewinder mechanism having the hereinabove described characteristics and which includes additional control means which become automatically operative during those periods of time when the dancer roll is rapidly moved toward one or the other of its two extreme positions, for thereby augmenting the driving and/or braking forces imparted to the rewind roll.

These and other objects are attained by the means described herein and as disclosed in the accompanying drawings, in which:

FIG. 1 is a side view of a rewinder device embodying the teachings of the present invention.

FIG. 3 is a view taken on line 3—3 of FIG. 2.

FIG. 5 is a view on line 5—5 of FIG. 2.

FIG. 6 is a view on line 6—6 of FIG. 5.

FIGURE 7 illustrates a wiring circuit for the electrical units associated with mechanical elements of the invention.

Figure 4:
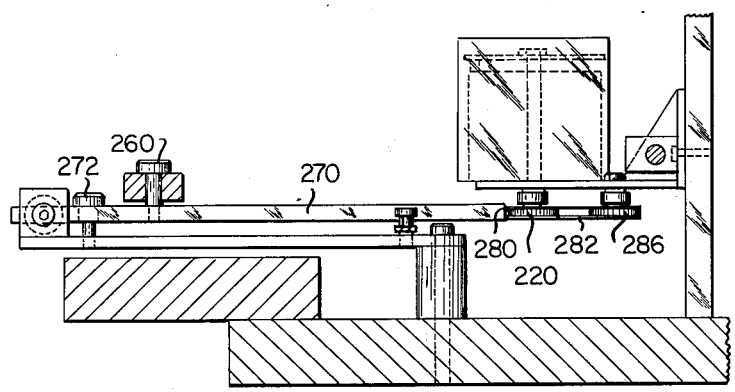
FIG. 4 is a view on line 4—4 of FIG. 1.
Figure 2:
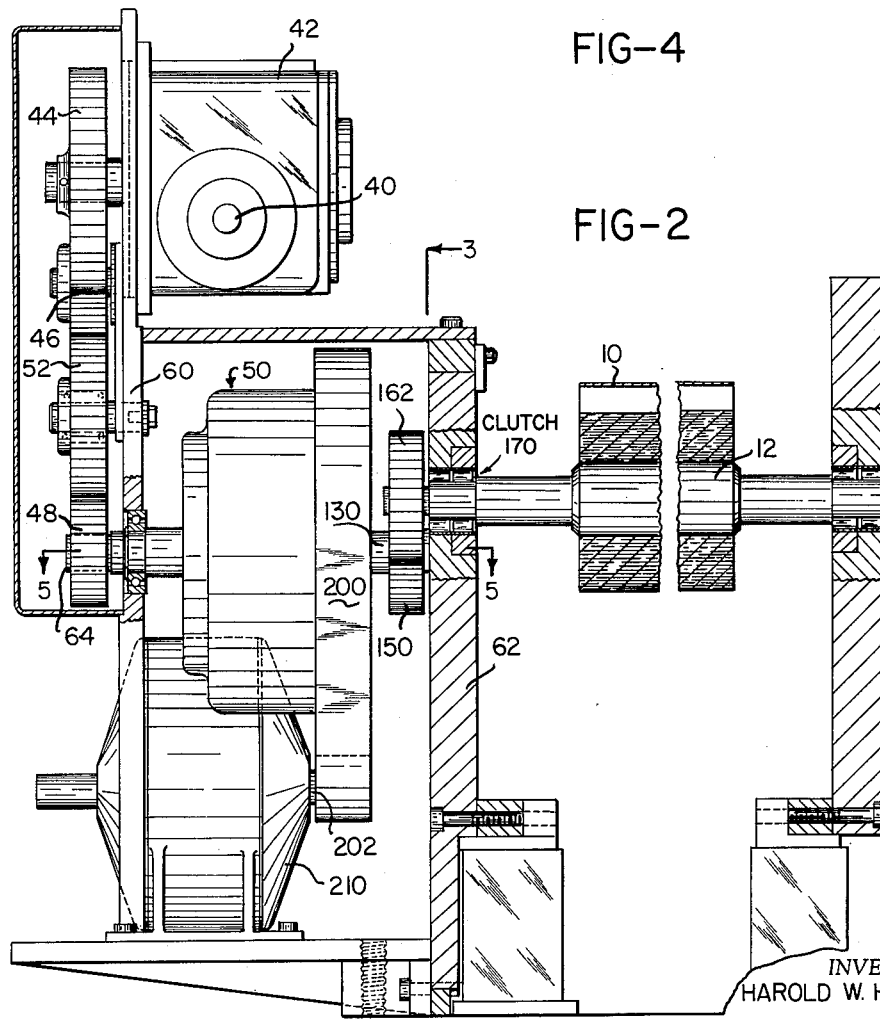
FIG. 2 is a view taken on line 2—2 of FIG. 1.

With reference now to the drawings, the numeral 10 denotes generally a continuous web which is being rewound on core shaft 12 of FIG. 2.

The web, note FIG. 3, is caused to pass over idler rollers 20, 22 and 24 en route to the core shaft, wherein rollers 20 and 24 extend transversely of the printing press frame between frame elements 26 thereof. Roller 22 is suitably journaled to the outer portion of a dancer arm lever 30, the other end of said lever being mounted for movement about shaft 32. A segmental gear 34 having gear teeth 36 is secured relative to lever 30 whereby to rotate about shaft 32 incident to movement of the outer end of the lever. Gear teeth 36 of segment 34 is adapted to engage the teeth of gear 38 of a variable voltage regulator for a purpose hereinafter more fully described.

The numeral 40 denotes generally the main drive shaft of a rotary printing press, said drive shaft being suitably driven by means remote from the rewinder. The present invention is neither concerned with nor directed to the drive means for shaft 40, said means being conventional and well-known in the art.

With particular reference now to FIG. 1, it will be noted that the numeral 42 denotes generally a so-called hypoid gear box which includes a spur gear 44 which is driven by shaft 40. Gear 44 may engage gear 46 when said latter gear is mounted for rotation about center A for imparting rotary motion to input gear 48 of a differential indicated in FIG. 5 by the numeral 50, through intermediate gear 52. If it should be desired to rotate input gear 48 in the opposite direction, gear 46 may be shifted to rotate on center B being placed in driven relationship with gear 44 through idler gear 45.

In passing, it will be noted that if gear 46 is mounted for rotation on center C, it will be placed in a neutral position and input gear 48 disengaged from driving connection with gear 44 of the gear box 42.

With particular reference now to FIGS. 5 and 6, the numerals 60 and 62 denote a pair of laterally spaced frame elements, between which the differential 50 is mounted. Input gear 48 is mounted in driving relationship with pinion shaft 64, which is rotatably journaled on bearings 66 relative to frame 60. An input pinion gear 68 is secured to or formed integral with the other end of shaft 64, said shaft being journaled as at 70 to wall 80 of the differential housing. A plurality of sets of idler gears 90, 92, 94 and 96 are rotatably journaled on shafts 100, 102, 104 and 106, respectively. The opposite ends of said shafts are secured to and carried by opposed walls 80 and 81 of the differential housing, which walls they span, as clearly illustrated in FIG. 5.

The forward end of input pinion gear 68 is axially recessed for accommodating bearing assemblies 120 and 124 by which end E of the output pinion shaft 130 is rotatably journaled relative to the input pinion gear 68. An output pinion gear 140 is integral with or secured to and carried by shaft 130 which is rotatably journaled to wall 81 of the differential housing as by bearings 132. A gear 150 is secured in driven relationship with shaft 130, said gear, note FIGS. 2 and 3, being in driven relationship with gear 162 of the core shaft 12. Shaft 130 is also rotatably journaled relative to frame 62 by bearings 136 (FIG. 5); and in the preferred embodiment of the invention a driven connection is effected between gear 162 and core shaft 12 by means of a conventional "Sprag Type," one-way clutch denoted generally by the numeral 170. The purpose of said clutch is to effectively preclude the accidental or unintentional reverse rotation of the core shaft when the press is stopped. A dog 172 may be provided for enabling an operator to disengage clutch 170 for effecting manual reverse rotation of the core shaft 12.

From the foregoing, it will be noted that I have thus mounted differential housing 50 for relative rotation with frame elements 60 and 62 and relative to shafts 64 and 130.

The housing of the differential may include a driving ring 180 which circumscribes the housing, to which it is secured by means of bolts 182. The outer periphery of ring 180 may be provided with teeth 184 for engagement with complementary portions of a timer belt 200 which is in driven connection with input shaft 202 of an eddy current brake 210 via gear 204.

With particular reference again to FIGS. 5 and 6, it will be noted that rotation of input pinion gear 68 will cause idler gears 90 and 92 to rotate about their respective shafts, said idler gears imparting rotation to idler gears 94 and 96, respectively, which latter gears drive the output pinion gear 140 for imparting a turning torque to shaft 130.

At this point it will be noted that the torque applied to pinion shaft 64 can be delivered to gear 150 or it may be imparted to ring gear 180 and thence to the eddy current brake. The structural details of the differential will suggest that the torque imparted to gear 150 is always in balance with the torque applied to ring gear 180. In other words, if the rate of rotation of ring gear 180 is decreased by a braking action through the eddy current brake, gear 150 will rotate faster, and vice versa, in the event that the load on the core shaft 12 remains constant.

With reference again to FIGS. 1 and 3, it should be understood that the variable voltage control actuated by gear 38 and a second variable voltage control actuated by gear 220 are in electrical circuit with the eddy current brake in a conventional manner as illustrated in FIG. 7 whereby the braking effect of the eddy current brake may be increased according to the variable voltage applied thereto through the controls actuated by gears 38 and 220.

FIGURE 7 is a circuit diagram illustrating the variable voltage controls and their connections with the eddy current brake 210. In this figure the reference numeral 211 generally designates a double pole single throw toggle switch controlling the current flow to the electrical units.

Numeral 212 generally designates the voltage control connected at A6 to the actuating gear 38 while the reference numeral 213 designates the variable voltage control connected at A5 with the gear 220.

The numeral 214 generally designates a full wave bridge selenium rectifier connected in the circuit between the voltage control 213 and the electrical element generally designated 215 of the eddy current brake 210.

The connections AL1 and AL2 of the circuit diagram are shown in FIGURE 3 in association with the variable voltage control which is actuated by the gear 38 while the connections A4 and A6 are shown in FIGURE 3 in association with the variable voltage control which is actuated by the gear 220 and the connections A1 and A2 of the circuit diagram are shown in FIGURE 3 to illustrate the connections of the electrical unit 215 of the eddy current brake.

Under normal, or slow movement of arm 30, no movement is imparted to pinion sprocket 220. However, with a fast raising or lowering movement of dancer roll 22 and arm 30, a resultant force is exerted onto the double end cylinder 240 by a piston on rod 242 which constitutes a telescopic linkage for actuation of lever 270 incident to lowering of the dancer roll and free outer end of lever 30. Rapid downward movement of piston rod 242 will tend to effect an accentuated flow of oil through needle valve 246, thus creating a back pressure on the pivot 260 of connecting cylinder 240 to lever 270 which is pivoted at 272. That end of arm 270 adjacent to 272 is normally maintained in a neutral or balanced position by means of springs J and K. The degree of pressure balance may be effected by means of adjusting screws 271 and 273', the inner ends of which abut elements 273 and 275, respectively, as illustrated. The opposite end of lever 270 is secured as at 280 to reach 282 of a closed loop roller chain which passes over sprockets 284, 286 and 220; wherein sprocket 220 controls the actuating characteristics of variable voltage control.

The aforementioned pressure exerted on pivot point 260 will be transmitted to roller chain 282, thereby turning sprocket 220 in a counter clockwise direction for the purpose of increasing the voltage applied to the eddy current brake, thereby increasing the rate of rotation of the core shaft 12. This will take up paper causing lever 30 to be lifted to its normal position for that particular rewind roll size. As lever 30 is restored to its normal position lever 270 will also be restored to its normal position whereby minor variations or fluctuations in the setting of lever 30 will result in actuation of gear 38 of the variable voltage regulator which also controls the operation characteristics of the brake.

In this connection, it will be noted that whereas actuation of each gear 38 and 220 control the operating characteristics of the eddy current brake, the control affected by actuation of gear 38 is considerably slower and relatively minor to the type of control which is attained through actuation of sprocket gear 220.

The letters R and S of FIG. 3 denote a pair of similar ball checked needle control valves which permit free flow of fluid from reservoir Q to cylinder 240 and controlled flow rate in the direction indicated by the headed arrows from cylinder 240 to reservoir Q.

The initial tension adjustment by the operator is obtained by adjusting hand knob 300 which in turn moves the entire assembly 304 containing sprockets 284, 286 and 220 relative to arm 270; and since the lever arm 270 remains in its initial or neutral position (FIG. 3) during such adjustment, a movement of chain 282 will result moving or turning pinion 220 to an appropriate voltage setting.

Initial motion of hand knob 300 is translated into linear motion of assembly 304 by reason of the threaded engagement of the lower threaded end 301 of shaft 302 with internally threaded nut 303 either with or carried by assembly 304.

From the foregoing it will be noted that I have thus provided simple, yet highly effective means for enabling an operator to initially pre-set the degree tension of web 10, with the assurance that thereafter it will be continually and automatically held to the same tension throughout the entire rewinding operation and during those periods of time when the press is stationary or operating at full speed.

It should be understood that various changes may be made in the structural details of the device, within the scope of the appended claims, without departing from the spirit of the invention.

What is claimed is:

1. A web winding machine, including a drive shaft, a winding shaft and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for imparting divided rotational torque to the cage and the output shaft, braking means effective variably to resist rotation of the cage including an eddy brake, and a pair of variable voltage controls individually adjustable and jointly effective to vary the electrical voltage impressed on the eddy current brake, thus, to determine the torque transmitted to the output shaft.

2. A web winding machine, including a drive shaft, a winding shaft, and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for imparting divided rotational torque to the cage and the output shaft, braking means effective variably to resist rotation of the cage, means to establish a control loop in the web being wound including a pair of web supporting rolls and an intermediate dancer roll to ride on the web intermediate said rolls and variably portionable by web tension effected changes in the loop, a pair of variable voltage controls individually adjustable and jointly effective to vary the electrical voltages impressed on the eddy current brake, and operative connections between the dancer roll and said variable voltage controls for effecting individual actuation thereof, thus to determine the torque transmitted to the output shaft.

3. A web winding machine, including a drive shaft, a winding shaft, and a drive transmission intervening said shafts, said transmission including an input shaft operable by the drive shaft and an aligned shaft coupled with the winding shaft, a cage rotatably supported by said shafts, a drive pinion on the input shaft, a pinion on the output shaft, idler gears journaled in the cage surrounding and in joint mesh with the said pinions for imparting divided rotational torque to the cage and the output shaft, braking means effective variably to resist rotation of the cage, means to establish a control loop in the web being wound including a pair of web supporting rolls and an intermediate dancer roll to ride on the web intermediate said rolls and variably portionable by web tension effected changes in the loop, a pair of variable voltage controls individually adjustable and jointly effective to vary the electrical voltages impressed on the eddy current brake, and operative connections between the dancer roll and said variable voltage controls for effecting individual actuation thereof, said connections including an oscillatable lever pivoted to the machine and supporting the dancer roll, one of the voltage controls having an operating gear, and a toothed segment carried by the lever and meshing with the gear for rotating the gear in accordance with dancer roll effected oscillations of the lever, thus to determine the torque transmitted to the output shaft.

4. A web winding machine, including a drive shaft, a winding shaft and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for imparting divided rotational torque to the cage and the output shaft, braking means effective variably to resist rotation of the cage including an eddy brake and a voltage control therefor, means to establish a control loop in the web being wound including a pair of web supporting rolls and an intermediate dancer roll to ride on the web intermediate said roll and variably portionable by web tension effected changes in the loop, operative connections between the dancer roll and the voltage control to shift said control in accordance with web loop tension determined position of the dancer roll, and additional means for independently adjusting the effective voltage determining position of said voltage control.

5. A web winding machine, including a drive shaft, a winding shaft and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for imparting divided rotational torque to the cage and the output shaft, electrically controlled braking means effective variably to resist rotation of the cage, means to establish a control loop in the web being wound including a pair of web supporting rolls and an intermediate dancer roll to ride on the web intermediate said rolls and variably portionable by web tension effected changes in the loop, a pair of variable voltage controls individually adjustable and jointly effective to vary the electrical voltages impressed on the eddy current brake, operative connections between the dancer roll and said variable voltage controls for effecting individual actuation thereof, said connections including a lever pivoted to the machine, linkage connecting the dancer roll with said lever for oscillation thereof, a rotatable brake voltage control including an operating gear, and means connecting the lever and gear for rotating the gear in accordance with oscillations of the lever.

6. The structure specified in claim 5, in which said connecting means includes a sprocket chain secured to the lever and in driving mesh with the gear.

7. The structure specified in claim 5, in which said connecting means include a pair of idlers, an endless sprocket chain supported by the gear and idlers, and means securing an intermediate proportion of the chain to the lever for movement therewith to actuate the gear and controls when the lever is oscillated.

8. The structure as specified in claim 5 in which said connecting linkage includes telescoping piston and cylinder members, an impounded hydraulic medium, and adjustable throttle means for controlling the rate of flow of the impounded medium and thus the rate of relative telescoping of the members.

9. A web winding machine, including a drive shaft, a winding shaft and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for effecting divided rotational torque to the cage and the output shaft, and electrically controlled braking means effective variably to resist rotation of the cage, means to establish a control loop in the web being wound including a pair of web supporting rolls and an intermediate dancer roll to ride on the web intermediate said rolls and variably portionable by web tension effected changes in the loop, a pair of variable voltage controls individually adjustable and jointly effective to vary the electrical control of the brake, operative connections between the dancer roll and said variable voltage controls for effecting individual actuation thereof, said connections including a lever pivoted to the machine, linkage connecting the dancer roll with said lever for oscillation thereof, a rotatable brake voltage control including an operating gear, means connecting the lever and gear for rotating the gear in accordance with oscillations of the lever, and yieldable stabilizers mounted on the machine and reacting on the lever to effect a normal neutral positioning thereof.

10. A web winding machine, including a drive shaft, a winding shaft and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for effecting divided rotational torque to the cage and the output shaft, braking means effective variably to resist rotation of the cage including an eddy current brake and variable voltage control means adjustable to vary the electrical voltages impressed on the eddy current brake, thus to determine the torque transmitted to the output shaft, means to establish a control loop in the web being wound including a pair of web supporting rolls and an intermediate dancer roll to ride on the web intermediate said rolls and variably portionable by web tension effected changes in the loop, said voltage control means including a pair of variable voltage controls individually adjustable and jointly effective to vary the electrical voltages impressed on the eddy current brake, and operative connections between the dancer roll and said variable voltage controls for effecting individual actuation thereof, said connections including a lever pivoted to the machine, linkage connecting the dancer roll with said lever for oscillation thereof, a rotatable actuator for the brake voltage control including an operating gear, means connecting the lever and gear for rotating the gear in accordance with oscillations of the lever, yieldable stabilizers mounted on the machine and reacting on the lever to effect a normal neutral positioning thereof, and means for effecting bodily adjustment of the gear relative to the lever, whereby the means connecting the lever and gear will effect rotative adjustment of the gear and control and thus vary the braking action for a stabilized position of the lever.

11. A web winding machine, including a drive shaft, a winding shaft and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for effecting divided rotational torque to the cage and the output shaft, and electrically controlled braking means effective variably to resist rotation of the cage, means to establish a control loop in the web being wound including a pair of web supporting rolls and an intermediate dancer roll to ride on the web intermediate said rolls and variably portionable by web tension effected changes in the loop, a pair of variable voltage controls individually adjustable and jointly effective to vary the electrical control of the brake, operative connections between the dancer roll and said variable voltage controls for effecting individual actuation thereof, said connections including a lever pivoted to the machine, linkage connecting the dancer roll with said lever for oscillation thereof, a rotatable brake voltage control including an operating gear, means connecting the lever and gear for rotating the gear in accordance with oscillations of the lever, and additional manually operable means for positively setting said control in a selected primary adjustment.

12. A web winding machine, including a drive shaft, a winding shaft and a drive transmission intervening said shafts, said transmission including an input shaft operable by the drive shaft and an aligned output shaft coupled with the winding shaft, a cage rotatably supported by said shafts, a drive pinion on the input shaft, a pinion on the output shaft, idler gears journaled in the cage surrounding and in joint mesh with the said pinions for imparting divided rotational torque to the cage and the output shaft, an eddy current brake effective variably to resist rotation of the cage, thus to determine the torque transmitted to the output shaft, means to establish a control loop in the web being wound including a pair of web supporting rolls and an intermediate dancer roll to ride on the web intermediate said rolls and variably portionable by web tension effected changes in the loop, and a pair of variable voltage controls individually adjustable and jointly effective to vary the electrical voltages impressed on the eddy current brake, and operative connections between the dancer roll and said variable voltage controls for effecting individual actuation thereof, said connections including individual operating levers for the respective voltage controls individually pivotally supported by the machine, means mounting the dancer roll on one of the levers for direct actuation thereof, and variable length linkage connecting the other lever to and for movement by the dancer roll including telescoping piston and cylinder members, impounded hydraulic medium in the cylinder and throttling means to determine the rate of displacement of the medium in the cylinder.

13. The structure specified in claim 12, in which yieldable stabilizers mounted on the machine react on said other lever to resist movement thereof by the dancer roll.

14. The structure specified in claim 12, which includes manually operable controller adjusting means for variably determining the selected primary adjustment of one of said variable voltage controllers.

15. The structure specified in claim 12, in which yieldable stabilizers mounted on the machine react on said other lever to resist movement thereof by the dancer roll, and manually operable controller adjusting means are provided operative variably to determine selected primary adjustment of one of said variable voltage controllers.

References Cited by the Examiner

UNITED STATES PATENTS

| 995,552 | 6/1911 | Osborn | 74—789 |
| 1,108,971 | 9/1914 | Clark. | |
| 1,786,917 | 12/1930 | Oehmichen | 242—75.5 |
| 1,816,909 | 8/1931 | Larsen | 242—75.5 X |
| 2,236,631 | 4/1941 | Thomas et al. | 74—792 |
| 2,443,763 | 6/1948 | Dahlgren et al. | 242—75.5 X |
| 2,741,437 | 4/1956 | Haworth | 242—45 |
| 2,838,921 | 6/1958 | Winslow et al. | 242—75.5 |
| 3,116,032 | 12/1963 | Roberts | 242—75.43 |

FOREIGN PATENTS 504,302  4/1939  Great Britain.

MERVIN STEIN, *Primary Examiner.*

RUSSELL C. MADER, *Examiner.*